Nov. 26, 1940.  G. MORRIS ET AL  2,222,680
WATER SYSTEM FOR BROODER HOUSES
Filed Feb. 17, 1939  2 Sheets-Sheet 1
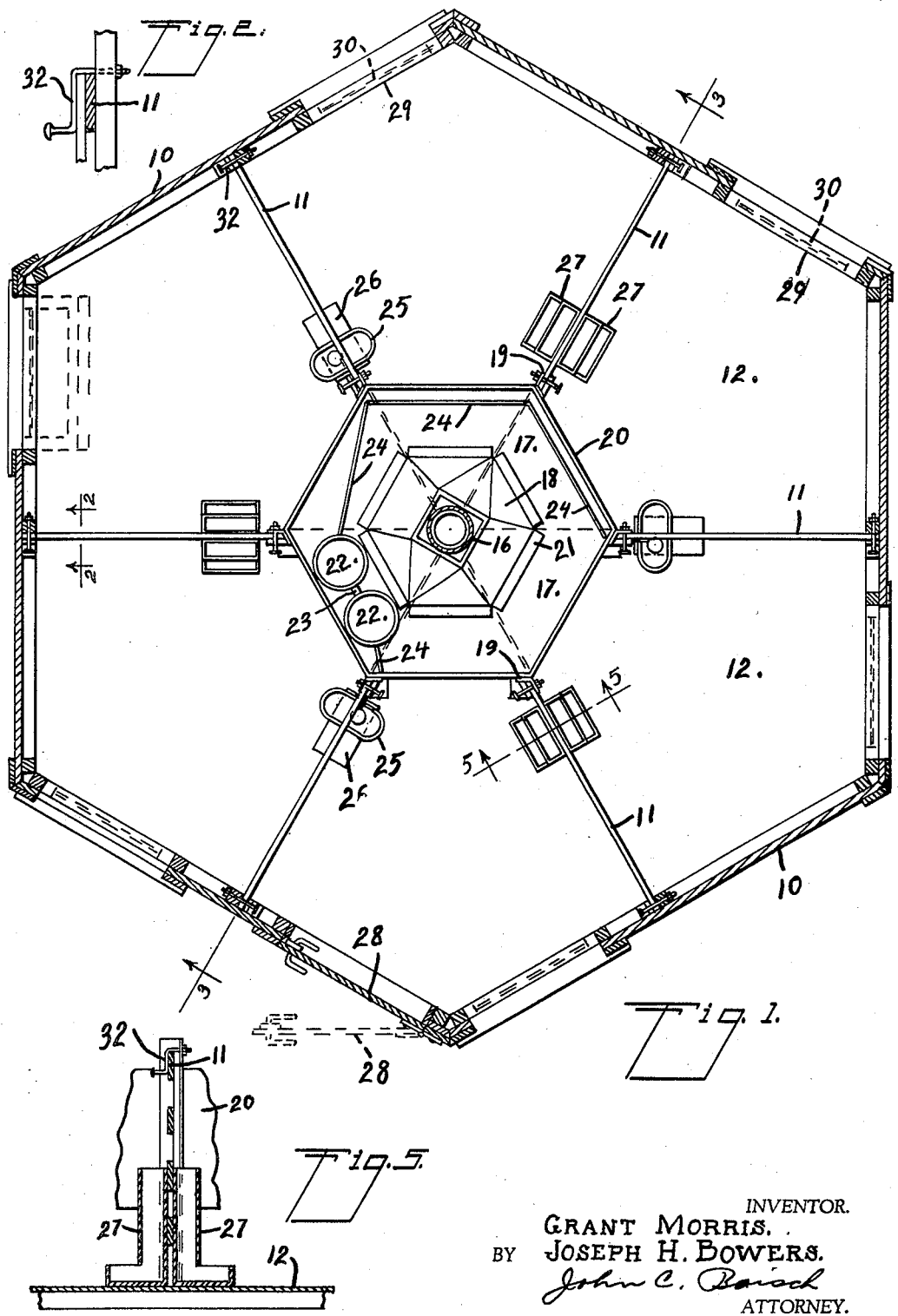
INVENTOR.
GRANT MORRIS.
JOSEPH H. BOWERS.
BY John C. Raisch
ATTORNEY.

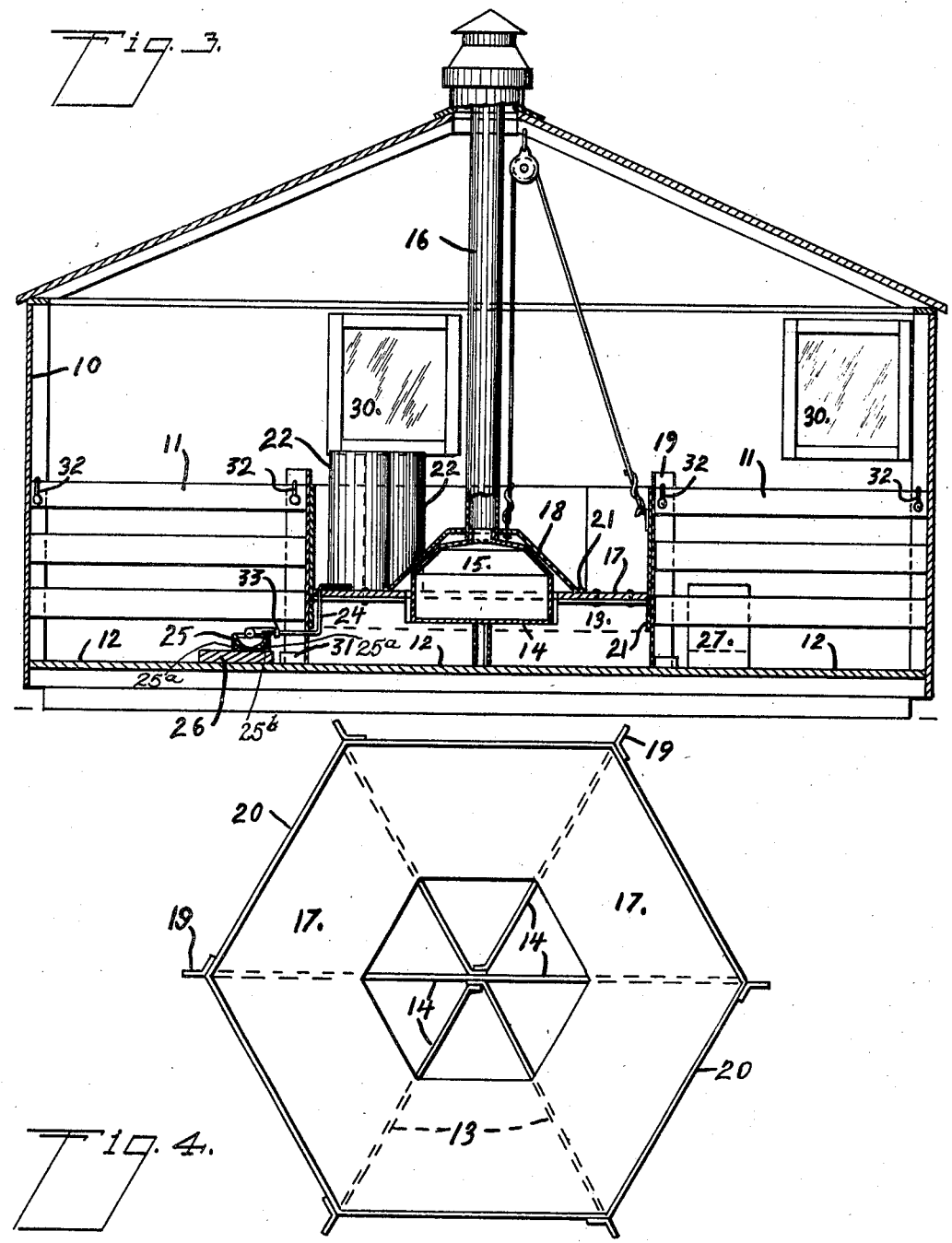

Patented Nov. 26, 1940

2,222,680

UNITED STATES PATENT OFFICE 2,222,680

WATER SYSTEM FOR BROODER HOUSES

Grant Morris and Joseph H. Bowers, Wahoo, Nebr.

Application February 17, 1939, Serial No. 256,893

7 Claims. (Cl. 119—16)

This invention relates generally to brooder houses and particularly to water systems for centrally heated brooder houses.

In brooder houses having a central heating system with which this invention is adapted to be used includes an upper heating chamber for heating the house generally, and a lower heating chamber adapted to heat pens for little pigs, said pens being adjacent the source of heat. Water for the animals should not be tepid or warm but should merely be heated sufficiently to take the chill out of it, otherwise the animals will not drink sufficient quantities thereof.

It is therefore an important object of our invention to provide a water reservoir that is kept from freezing by the warm air of the heating chamber of the heating system.

It is another object of our invention to provide float controlled drinking fountains arranged to be accessible from adjacent sow pens.

It is another object of the invention to employ the warm air from the little pig pens for taking the chill off the water in the fountains.

Still another object of the invention is to heat the air in the little pig pens to a suitable temperature for young pigs, said temperature being approximately 70°.

A further object of the invention is to mount the fountains in upwardly spaced relation with the floor of the brooder house so that dirt, straw, and other foreign matter will not fill up the fountain.

A further object of the invention is to provide a step adjacent the fountains to permit the little pigs to reach said fountain when they start to drink water.

A still further object of the invention is to provide removable gates separating the sow pens.

Numerous other objects and advantages of the invention will be apparent as it is better understood from the following detailed description, which, taken in connection with the accompanying drawings, discloses a preferred embodiment thereof.

Referring to the drawings:

Figure 1 is a sectional plan view of a brooder house having the roof removed to show the interior arrangement thereof with a center heating plant and our invention combined therewith.

Figure 2 is a partial section taken on line 2—2 of Figure 1.

Figure 3 is an elevational view in section taken on line 3—3 of Figure 1.

Figure 4 is a plan view of the central heating unit.

Figure 5 is a partial section taken on line 5—5 of Figure 1.

Referring more particularly to the drawings, reference numeral 10 indicates the side walls of the brooder house. The preferred embodiment of the brooder house has six walls with a radially extending gate 11 for each wall, said gates extending from the center of the respective walls inwardly toward the center of the brooder house. The house has a floor 12 of wood flooring or other suitable material. A central heating system or plant is disposed centrally of the brooder house and rests on the floor thereof, said heating plant having six vertical radial partitions 13 meeting at the center and forming continuations of the gates 11. The partitions are notched at 14 adjacent their inner ends, said notches extend part way down from the top of said partitions. A stove 15 is received in the notches and is supported by the partitions, said stove having a pipe or stack 16. A horizontal baffle 17 is disposed about the stove and rests on and is supported by the vertical partitions 13, the inner edges of the baffle are spaced from the stove and the inner edge portions thereof support a removable canopy 18 disposed over the stove. Vertical angle irons 19 are secured to the respective free ends of the vertical partitions and extend upwardly of the baffle 17. A vertical apron extends about the heating plant and comprises sides 20 secured to the respective angle irons 19. The apron extends upwardly of the baffle 17 and forms a heating chamber about the upper part of the stove for heating the brooder house. The lower edges 21 of the apron are spaced upwardly of the floor of the brooder house to permit little pigs to pass beneath same into the spaces between the respective vertical partitions 13, thus providing little pig pens which are warmed by downwardly circulating air from the stove. The canopy 18 aids in deflecting the air toward the bottom of the little pig pens which are preferably warmed to a temperature of approximately 70°. The rest of the brooder house is heated to a temperature of approximately 40°. The watering system comprises reservoirs or tanks 22 which are connected together at the bottom by pipe 23 so that the water level therein will be equalized. Pipes 24 connected with the tanks carry water to drinking fountains 25. There is a drinking fountain secured to the bottom horizontal piece of every other gate by bolts 25a in flanges 25b of said fountains and the water level in each of said fountains is controlled by a float valve of conventional type, said fountains being preferably of any suitable commercial type now on the market. Each drinking fountain is secured to its respective gate in upwardly spaced relation with the floor of the house so that dirt, straw, and other foreign material will not fill them up. A block of wood 26 is positioned beneath each fountain, and said blocks extend outwardly thereof, thereby providing a step whereby the little pigs may reach the fountain to drink from same. The water in the tanks in the heating chamber is kept from freezing by heat from the stove, but may not be sufficiently heated to a suitable temperature for the little pigs to drink. It is therefore necessary to also warm the water a little in the fountains to take off the chill, and this is effected by warm air coming from the little pig pens, said fountains all being adjacent said pens and so positioned with respect to the lower edge 21 of the apron as to permit said warm air to strike said fountains. It is not desired to heat the water but merely take the chill off as the animals will not drink a sufficient quantity of warm or tepid water. It should be noted that the gates 11 separate the house into sow pens, and each pen is preferably provided with a feed box 27. The temperature in the brooder house generally is warm enough for the adult animals. The temperature in the little pig pens is considerably higher than that in the house generally and is sufficient to keep the little pigs warm. A door 28 is provided in one wall of the house to permit access therein by persons taking care of said house. Each pen is provided with a small door 29 through which the animals may pass into or out of the house and windows 30 provide light for the house. Each gate 11 is adapted to be removed, being held in position at the bottom by cleats 31 and adjacent the top by latches 32 which are crank shaped and pivoted in the respective upright members adjacent the respective gates. In removing gates to which the fountains are attached, it is first necessary to unscrew the coupling 33 and pipe 24. It will be noted that one fountain provides drinking water for animals in the pens on opposite sides of the respective gates thereby providing drinking water for all the pens. The tanks are preferably filled with water and the stove fired from one side so that it will be unnecessary for the attendant to enter any of the pens except the one having the large door 28 while attending to the water supply and fuelling of the stove.

It is thought that the invention and many of its attendant advantages will be readily understood from the foregoing description and it will be apparent that various changes may be made in the form, construction, and arrangement of the parts without departing from the spirit and scope of the invention or sacrificing all of its material advantages.

Having thus described our invention, what we claim is:

1. The combination of a six sided brooder house having a floor, a central heating plant, six removable gates radiating from the central heating plant to the outer walls of the house thereby providing six sow pens, said central heating plant comprising six radial vertical partitions meeting at the center and aligned with the respective gates to form six little pig pens, said partitions being notched centrally at the top, a stove received in the notches of the partitions, a horizontal baffle about the stove, an apron about the outer ends of the vertical partitions, said apron extending upwardly of said baffle to form a heating chamber and downwardly thereof, the lower edge of said apron being spaced from the floor, a canopy over the stove to aid in deflecting warm air downwardly in the little pig pens, and a water system comprising a water reservoir in the heating chamber above the baffle, said water reservoir being warmed by warm air from the stove, a drinking fountain secured to every other gate and extending laterally of each side thereof adjacent the little pig pens, the water level of the fountains being controlled by float valves, and pipes connecting the reservoir with the respective fountains, said fountains being raised from the floor of the brooder house, and a step adjacent each fountain.

2. The combination of a brooder house having a floor and a plurality of sides, a central heating plant, a plurality of gates radiating from the heating plant separating the house into a plurality of sow pens, said central heating plant including a plurality of radial vertical partitions meeting at the center and forming little pig pens, said partitions being aligned with the respective gates with the respective free edges adjacent each other, said partitions being notched centrally at the top, a stove received in the notches of the partitions, a horizontal baffle about the stove, an apron about the partitions extending upwardly of the baffle and forming a heating chamber for the brooder house and downwardly of the baffle and having the lower edge thereof spaced from the floor, a canopy over the stove to aid in deflecting warm air downwardly in the little pig pens, and a water system comprising a water reservoir within the heating chamber, a drinking fountain secured to every other gate and extending laterally of each side thereof adjacent the little pig pens, the water level of each fountain being controlled by a float valve in each of same, and pipes connecting the reservoir with the respective fountains, said fountains being raised from the floor of the brooder house, and a step adjacent each fountain.

3. The combination of a water system with a central heating plant for brooder houses comprising six radial partitions meeting at the center to form little pig pens, and partitions being notched centrally, a stove received in said notches, a horizontal baffle about the stove, and an apron about the partitions extending upwardly of the baffle and downwardly thereof, the lower edge of said apron being spaced from the bottom edges of the partitions, said water system comprising a reservoir above the baffle, fountains positioned adjacent the free edge of every other vertical partition and spaced upwardly of the lower edges thereof, said fountains having their water level controlled by a float valve, in each of same, and pipes connecting the reservoir with the fountains, and a step adjacent each fountain adapted to permit little pigs to reach said fountain and to drink therefrom.

4. The combination of a water system with a central heating plant for brooder houses comprising a plurality of radial partitions meeting at the center to form little pig pens, said partitions being notched centrally, a stove received in said notches, a horizontal baffle, and an apron about the partitions extending upwardly of the baffle and downwardly thereof, the lower edge of said apron being spaced from the plane of the bottom edges of the partitions, said water system comprising a reservoir above the baffle, fountains positioned adjacent the free edge of every other vertical partition and spaced upwardly of the plane of the lower edges thereof, said fountains having their water level controlled by a float valve in each of same, pipes connecting the reservoir with the fountains, and a step adjacent each fountain adapted to permit little pigs to reach said fountain and to drink therefrom.

5. The combination of a water system with a central heating plant for brooder houses comprising a plurality of radial partitions meeting at the center to form little pig pens, said partitions being notched centrally, a stove received in said notches, a horizontal baffle about the stove, and an apron about the partitions extending upwardly of the baffle and downwardly thereof, the lower edge of said apron being spaced from the bottom edges of the partitions, said water system including a reservoir above the baffle, fountains positioned adjacent the free edge of every other vertical partition and spaced upwardly of the lower edges thereof, said fountains having their water level controlled by a float valve in each of same, and pipes connecting the reservoir with the fountains.

6. The combination of a water system with a central heating plant for brooder houses comprising a plurality of radial partitions meeting at the center to form little pig pens, said partitions being notched centrally, a stove received in said notches, a horizontal baffle about the stove and an apron about the partitions extending upwardly of the baffle and downwardly thereof, the lower edge of said apron being spaced from the bottom edges of the partitions, said water system including a reservoir above the baffle, fountains position adjacent the free edges of the partitions, said fountains having their water level controlled by a float valve in each of same, and pipes connecting the reservoir with the fountains.

7. The combination of a water system with a central heating plant for brooder houses comprising a plurality of radial partitions meeting at the center to form little pig pens, said partitions being notched centrally, a stove received in said notches, a horizontal baffle about the stove, and an apron about the partitions extending upwardly of the baffle and downwardly thereof, the lower edges of said apron being spaced from the bottom edges of the partitions, said water system including a reservoir above the baffle, fountains positioned adjacent the respective vertical edge of every other partition adjacent the apron, said fountains having their water level controlled by a float valve in each of same, and said pipes connecting the reservoir with the fountains.

GRANT MORRIS.
JOSEPH H. BOWERS.